`US011530124B2`

United States Patent
Koeck et al.

(10) Patent No.: US 11,530,124 B2
(45) Date of Patent: Dec. 20, 2022

(54) HAY STACKING APPARATUS

(71) Applicant: 1243653 B.C. Ltd., Kamloops (CA)

(72) Inventors: Anthony Erich Koeck, Kamloops (CA); Ernie Koeck, Kamloops (CA)

(73) Assignee: 1243653 B.C. Ltd., Kamloops (CA)

(*) Notice: Subject to any disclaimer, the term of this patent is extended or adjusted under 35 U.S.C. 154(b) by 18 days.

(21) Appl. No.: 16/989,650

(22) Filed: Aug. 10, 2020

(65) Prior Publication Data

US 2022/0041381 A1 Feb. 10, 2022

(51) Int. Cl.
*B65G 57/02* (2006.01)
*B66F 9/19* (2006.01)
*B66F 9/18* (2006.01)
*A01D 87/12* (2006.01)
*A01D 85/00* (2006.01)
*B66F 9/20* (2006.01)

(52) U.S. Cl.
CPC ............ *B66F 9/195* (2013.01); *A01D 87/126* (2013.01); *B66F 9/18* (2013.01); *A01D 85/005* (2013.01); *B65G 57/02* (2013.01); *B66F 9/205* (2013.01)

(58) Field of Classification Search
CPC .... A01D 87/126; A01D 85/005; A01D 87/12; A01D 87/122; A01D 87/127; A01D 2085/008; A01D 2087/128; A01D 90/083; A01D 90/08; A01D 87/0069; A01D 87/0053; A01D 87/003; A01D 90/10; A01F 29/005; B65G 67/00; B66F 9/18; B66F 9/085; B66F 9/195; E02F 3/407; E02F 3/401

See application file for complete search history.

(56) References Cited

U.S. PATENT DOCUMENTS

| 2,404,154 | A |   | 7/1946  | Williams |                |
|-----------|---|---|---------|----------|----------------|
| 2,817,449 | A | * | 12/1957 | Meyer, Jr. | A01D 87/126 |
|           |   |   |         |          | 414/723        |
| 3,208,612 | A | * | 9/1965  | Blair    | A01D 87/126    |
|           |   |   |         |          | 414/721        |
| 3,361,279 | A | * | 1/1968  | Brown    | A01D 85/005    |
|           |   |   |         |          | 414/502        |
| 4,634,336 | A | * | 1/1987  | Pearce   | A01D 87/122    |
|           |   |   |         |          | 414/679        |
| 5,127,789 | A | * | 7/1992  | McLellan | B65G 67/20     |
|           |   |   |         |          | 414/512        |
| 5,316,433 | A |   | 5/1994  | Chase    |                |
| 5,542,326 | A | * | 8/1996  | Borgford | A01D 87/127    |
|           |   |   |         |          | 30/379.5       |

(Continued)

*Primary Examiner* — Gregory W Adams
(74) *Attorney, Agent, or Firm* — Richard D. Okimaw

(57) ABSTRACT

An apparatus for stacking hay bales comprises a base frame securable to a motorized vehicle, a plurality of tines pivotally connected to the base frame extending to free distal ends, the tines defining locations therebetween spaced to correspond to a bale of hay and a push bar extending parallel to the base frame and movable between a retracted position proximate to the base frame to an extended position along the plurality of tines to push the hay bales from therebetween. In operation, the apparatus is used by passing at least two of a plurality of tines to each side of a hay bale, lifting the hay bale by a platform extending from a base of the plurality of tines and pushing the hay bales off the tines with the push bar.

15 Claims, 7 Drawing Sheets

(56) References Cited

U.S. PATENT DOCUMENTS

| | | | |
|---|---|---|---|
| 6,431,480 B1 * | 8/2002 | Hruska | ............... A01F 29/005 241/101.76 |
| 8,393,848 B1 | 3/2013 | Krizenawski | |
| 2002/0090281 A1 | 7/2002 | Siebenga | |

* cited by examiner

HAY STACKING APPARATUS

BACKGROUND

1. Technical Field

This disclosure relates generally agriculture and in particular to a method and apparatus for stacking hay bales.

2. Description of Related Art

Bales of hay are a common means and structure to form and store hay for subsequent use in feeding livestock. One common form of such hay bales are known as small rectangular bales which may also be called square bales. Such hay bales are commonly approximately 16 by 18 by (a variable length but commonly around 40 inches (406×457× 1016 mm) in diameter and have a typical weight of approximately 45-60 pounds (20 to 27 kg). Such bales are wrapped by 2 or more strands of twine to maintain the shape of the bale. Due to the shape and dimensions of such small rectangular hay bales, it is known that they can be stacked in alternating directions so as to improve cohesion between the layers. However, manually lifting such hay bales is known to be time consuming and labor intensive.

Small rectangular bales are easy to stack and store and can be easily lifted by a worker. Mechanical means of stacking such hay bales have been limited and accordingly many users continue to stack such hay bales by hand. In particular, bale wagons as they are commonly known are powered or pulled machines adapted to pick up individual bales of hay from a field and stack them into rows and levels where there are then transported to a barn or the like for storage. One disadvantage of bale wagon is that the hay bales are then all aligned with each other making any resultant storage unstable. If is frequently therefore necessary to reinforce the sides of bales stacked in such a manner so as to prevent falling or spreading of the bales.

Previous attempts have been made to provide a means for lifting hay bales. In particular applicant is aware of U.S. Pat. No. 8,393,848 issued Mar. 12, 2013 to Krizenawski. The Krizenawski device includes a bale sweep having a frame with a plurality of tines extending therefrom to pick up bales of hay. The bales of hay are removed from the Krizenawski device by friction with a bale of hay or a surface on which the bales are located. Disadvantageously, such friction may be unreliable to remove the bales from the device thereby requiring operator intervention and may topple the stack when at a stacking height. The Krizenawski device also does not allow free rotation of the tines relative to the frame as each tine includes a spring thereon so as to resist such free rotation. The springs of Krizenawski also limit the amount of movement of the tines due to the spring bottoming out and require the tines to have a substantial width between the bales.

SUMMARY OF THE DISCLOSURE

According to a first embodiment, there is disclosed an apparatus for collecting stacking and unstacking hay bales comprising a base frame securable to a motorized vehicle, a plurality of tines pivotally connected to the base frame extending to free distal ends, the tines defining locations therebetween spaced to correspond to a bale of hay and a push bar extending parallel to the base frame and movable between a retracted position proximate to the base frame to an extended position along the plurality of tines to push the hay bales from therebetween.

The apparatus may further comprise a chain drive for moving the push bar between the retracted and extended positions. The chain drive may extend along at least one of the plurality of tines. The chain drive may include a drive sprocket secured to the base frame and a distal sprocket supported by at least one of the plurality of tines with a chain driven therebetween. The push bar may be secured to the chain. The drive sprocket may be rotated by a motor. The motor may be selected from the group consisting of an electric motor, a pneumatic motor and a hydraulic motor.

Each of the plurality of tines may be supported by a support member extending from the tine to the base frame at a position above the pivot connection for that tine. The support members may be received in bores in the base frame. The support members may be slidably received within the bores. Each of the bores may include a spherical bearing therein. The support members may include a stop adapted to limit the downward rotation of the plurality of tines below horizontal and permit rotation above horizontal.

The plurality of tines may include a base flange extending away therefrom so as to form a support surface for supporting a hay bale thereon. The push bar may be located above the plurality of tines.

According to a further embodiment, there is disclosed a method for stacking hay bales comprising passing at least two of a plurality of tines to each side of a hay bale, lifting the hay bale by a platform extending from a base of the plurality of tines and pushing the hay bales off the tines with a pus bar movable from a retracted position adjacent to a base frame supporting the plurality of tines to a positon proximate to the distal end of the plurality of tines.

Other aspects and features of the present disclosure will become apparent to those ordinarily skilled in the art upon review of the following description of specific embodiments in conjunction with the accompanying figures.

BRIEF DESCRIPTION OF THE DRAWINGS

The accompanying drawings constitute part of the disclosure. Each drawing illustrates exemplary aspects wherein similar characters of reference denote corresponding parts in each view.

DETAILED DESCRIPTION

Figure 1:
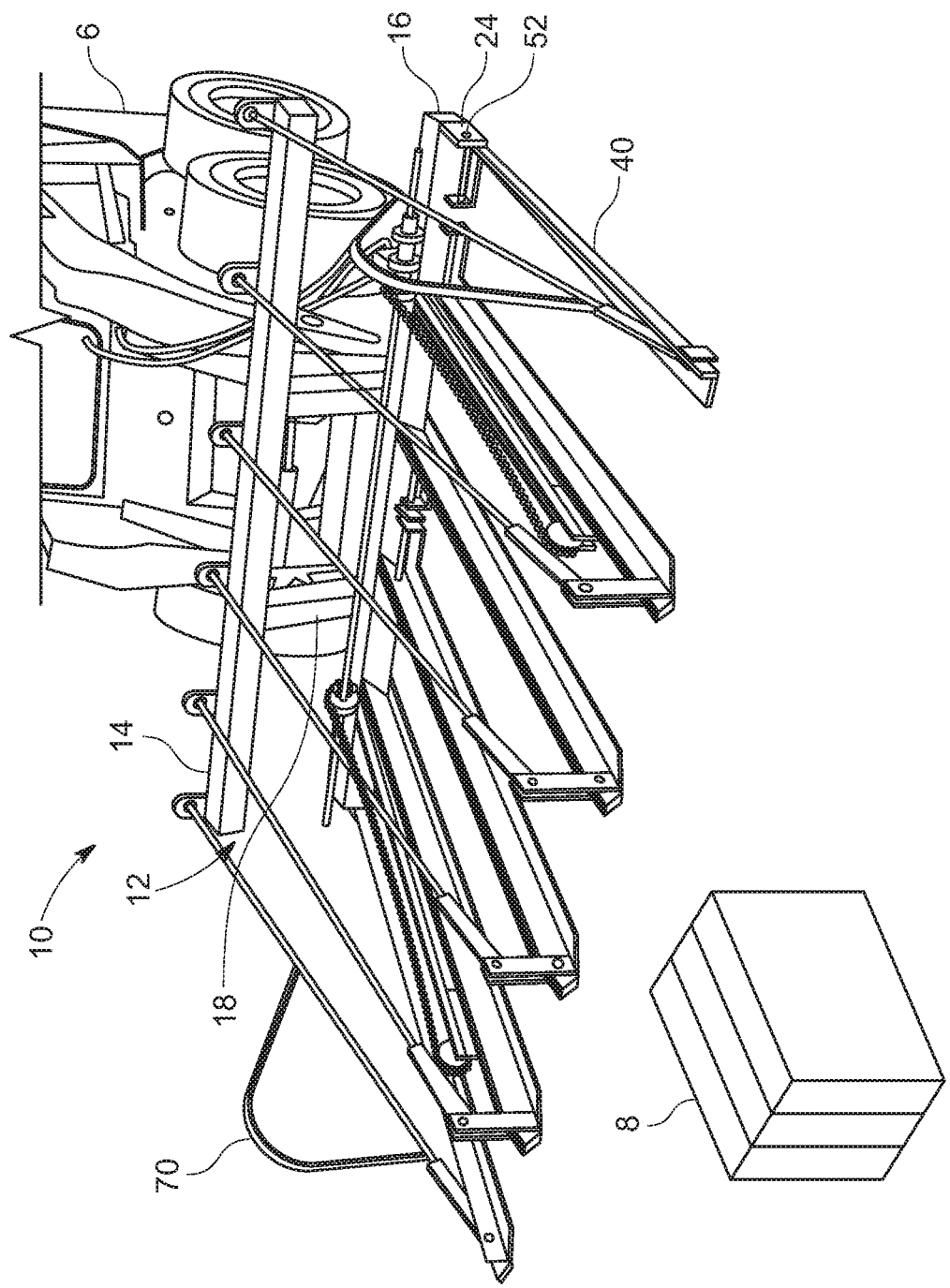
FIG. 1 is a perspective view of a motorized vehicle having an apparatus for stacking hay bales according to a first exemplary embodiment secured thereto.

Aspects of the present disclosure are now described with reference to exemplary apparatuses, methods and systems. Referring to FIG. 1, an exemplary apparatus for stacking hay bales 8 according to a first embodiment is shown generally at 10. As illustrated in FIG. 1, the apparatus 10 may be mounted to a motorized vehicle 6, such as, by way of non-limiting example, a skid steer loader although it will be appreciated that the apparatus 10 may be secured to any other vehicle type as well. The apparatus 10 comprises a base frame 12 having a plurality of tines 40 extending therefrom. The tines as spaced apart by a distance corresponding to the width of the hay bales it is intended to pick up. The apparatus further includes a push bar 80 located proximate to the base frame at an initial position which is operable to be moved towards the ends of the tines to push bales from between the tines.

The base frame 12 may be formed in any shape or configuration as suitable to support the tines as set out below. As illustrated in FIG. 1, the base frame 12 may include at least top and bottom members, 14 and 16 wherein the bottom member 16 supports the tines 40 and the top member 14 receives the support rods 60. The top and bottom members 14 and 16 may be spaced apart by a distance sufficient to position the top ends of the support rods 60 above the tines by a distance suitable to provide support thereto. In operation, it has been found that a height of between 24 and 36 inches (610 and 914 mm) has been useful although it will be appreciated that other heights may be useful as well. As illustrated, the base frame may include at least one upright portion 18 extending between the top and bottom members 14 and 16 to maintain them at the desired distance and provide strength to the apparatus. Although a single upright portion 18 is illustrated in FIG. 1, it will be appreciated that more than one may also be utilized. The upright member 18 may also include mounting means for securing the apparatus 10 to the motorized vehicle according to know means and using known connector types.

The base frame 12 has a width selected to lift a desired number of bales in rows extending parallel to the longitudinal length of the motorized vehicle 6.

As illustrated in FIG. 1, the apparatus 10 has a width selected to lift 5 rows although it will be appreciated that other numbers of rows may also be utilized. For an apparatus operable to lift 5 rows, the length of the top and bottom members will be sufficient to position 5 rows of hay bales along with 6 tines therealong. In practice is has been found that a length of at least 94 inches (2388 mm) has been required for such embodiments where the intended bales of hay have a width of 18 inches wherein the centre to centre spacing of the tines is the nominal width of the bale plus 3 inches so as to leave approximately the bale width plus 2 inches between the vertical faces of the tines in the present exemplary embodiment. It will be appreciated that the face to face distance between the tines and the widths of the tines may be adjusted by a user depending on the dimensions of the bales.

The base frame 12 includes a front and rear surface, 20 and 22, respectively, in which the connection means to the vehicle is located on the rear surface 20 and the tines 40 extend away from the front surface. It will be observed that the entirety of the tines and push bar and associated components are located within or proximate to the frame and therefore do not extend substantially behind the rear surface 20 so as to not be prone to contact or interference with the vehicle.

Figure 2:
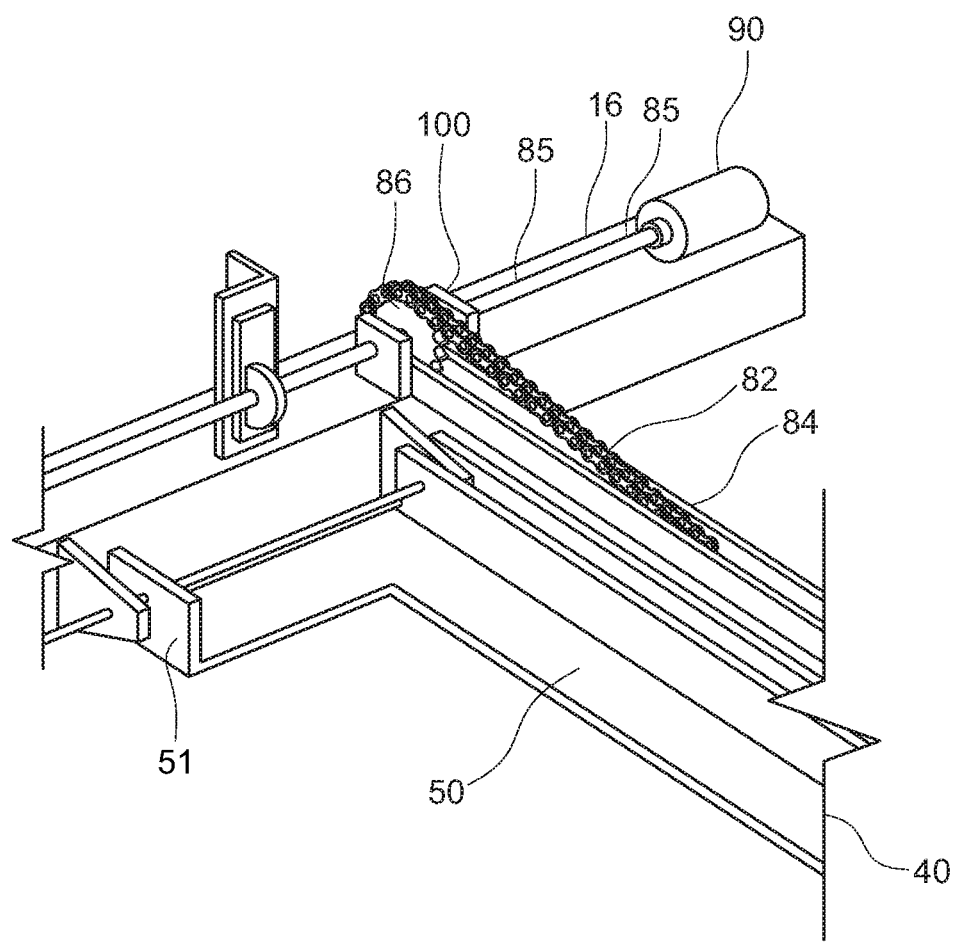
FIG. 2 is a perspective view of the apparatus of FIG. 1.
Figure 3:
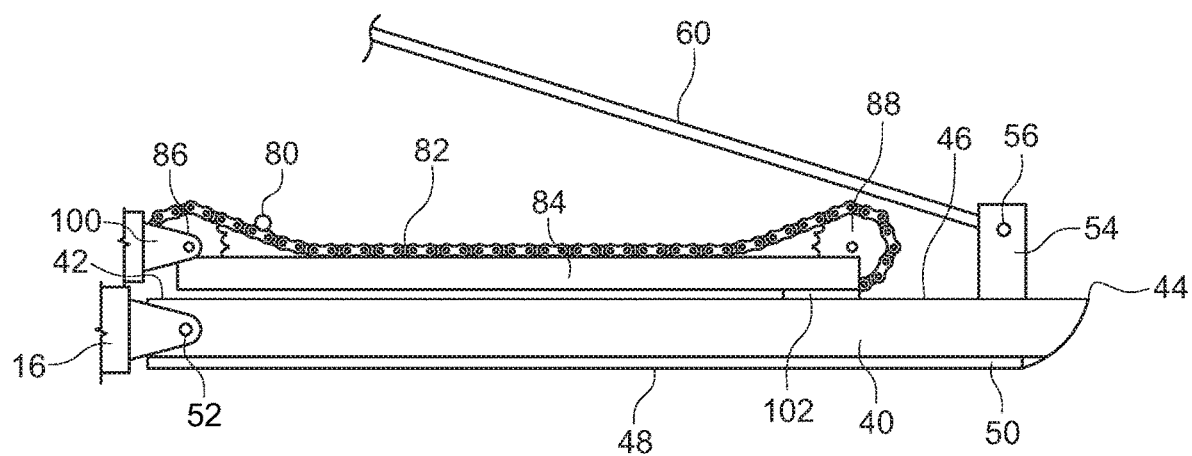
FIG. 3 is a side view of one of the tines the apparatus of FIG. 1 at an initial or retracted position.
Figure 6:
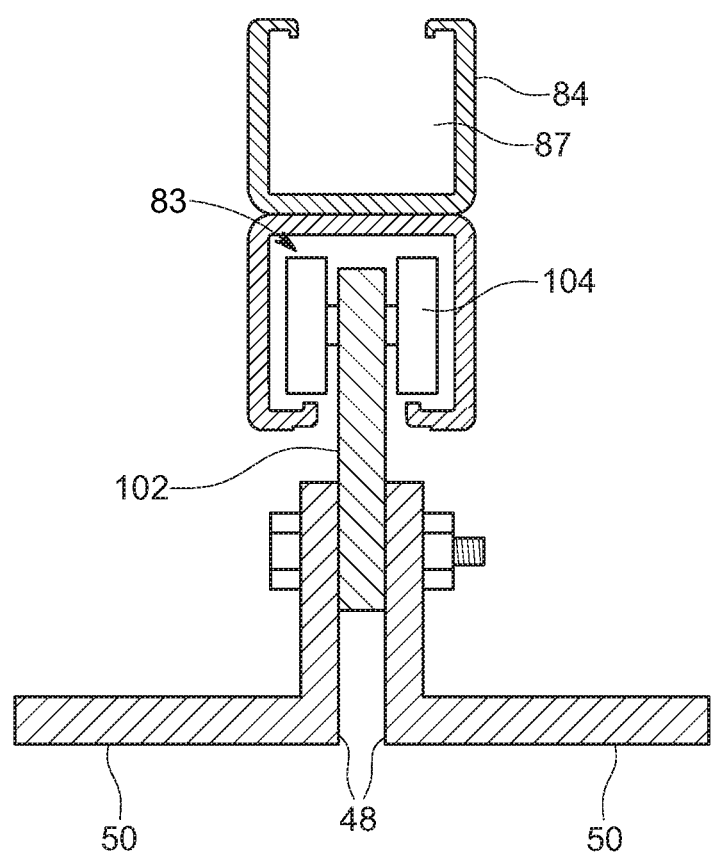
FIG. 6 is a cross-sectional view of one of the tines of the apparatus of FIG. 1 as taken along the line 6-6.

Turning now to FIG. 3, each of the tines 40 extend between a proximate and distal end, 42 and 44, respectively and top and bottom edges, 46 and 48, respectively. The tines 40 include a bottom flange 50 extending from the bottom edge towards each other flange. In particular, the two outside tines are only required to include a flange oriented towards the middle of the apparatus whereas each other tine includes a flange to each side thereof. The flange 50 extends from the tine 40 by a distance sufficient to support a bale of hay on the pair of opposed flanges whereas the tines 40 are spaced apart by a distance selected to receive a bale of hale therein. In practice it has been found that a spacing of 20 inches (508 mm) between tines and flange width of approximately 3 inches (76 mm) has been useful although it will be appreciated that other dimensions may be useful as well. As illustrated in FIG. 6, the tines may be formed by angle bar wherein two angle bars are connected together back to back to form a middle tine although other configurations may be utilized as well. As illustrated in FIG. 2, each tine may include an offset bracket 51 spaced apart therefrom so as to provide a second pivot connection to the bottom member 16 thereby increasing lateral stability of the tine about a tine shaft 52 supported on the bottom member 16.

The tines 40 are pivotally supported adjacent to the proximate end by a pivot connection 52. The pivot connection 52 which is supported on a pivot bracket 24 extending from the bottom member 16. The distal end 44 of each tine is cantilevered away from the bottom member 16 with a support rod 60 as will be more fully described below to prevent downward rotation thereof. As illustrated in FIG. 1, the support rod 60 may be pivotally connected directly to the tines at a pivot connection 56 or may optionally be connected to a riser 54 extending upwards from the tine 40 adjacent to the distal end 44. The riser 54 spaces the distal pivot connection 56 above the tine so as to provide space for the push bar chain assembly as will be more fully described below. As illustrated in FIG. 3, the distal end 44 of the tine may be angled or profiled to assist the tine to move over and above uneven ground.

As illustrated in FIGS. 1-4, the support rods 60 extend from the distal pivot connection 56 to the top member 14. The top member 14 includes a plurality of tabs 62 having a bore 64 therethrough. The bores 64 may include a low friction passage therethrough adapted to permit ease of movement and reduced wear of the support rods 60 therethrough such as by way of non-limiting example, spherical bearings or bushings. It will be appreciated that the bores 64 may be located through any other portion of the top member 14 as well. As illustrated in FIG. 6, the bores 64 may include a bushing 66 or other low friction guide thereto so as to facilitate movement of the support rod 60 therethrough. The support rod includes a pin 68 such as a cotter pin, lock pin or the like located to the opposite end of the support rod from the distal pivot 54 to prevent movement of the support rod 60 through the bore 64 past the pin. In operation, the pin 68 is located on a position along the support rod 60 such that when the pin 68 engages upon the tab 62, the associated tine 40 will be in a horizontal configuration. Upward pressure on the distal end 44 of the tine will cause the support rod 60 to move through the bore 60 so as to move the pin 68 away from the tab 62. Once the upward pressure on the distal end 44 of the tine is relieved, the support rod 60 may then move back through the bore 64 to engage the pin 68 on the tab 62.

As illustrated in FIGS. 1 and 2, one or more of the support rods 60 may include an extension 70 extending substantially upwards therefrom. The extension 70 may be formed of any shape and extend substantially vertical from the support rod 60. The extensions increase the height of the support rod and permit multiple layers of hay bales to be picked up by the apparatus 10.

Figure 4:
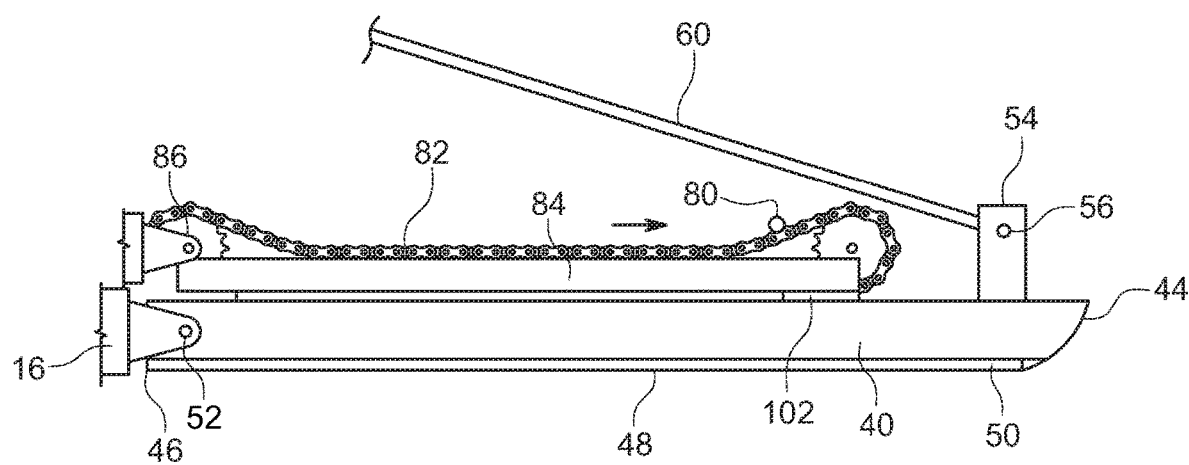
FIG. 4 is a side view of one of the tines the apparatus of FIG. 1 at a second or extended position.
Figure 5:
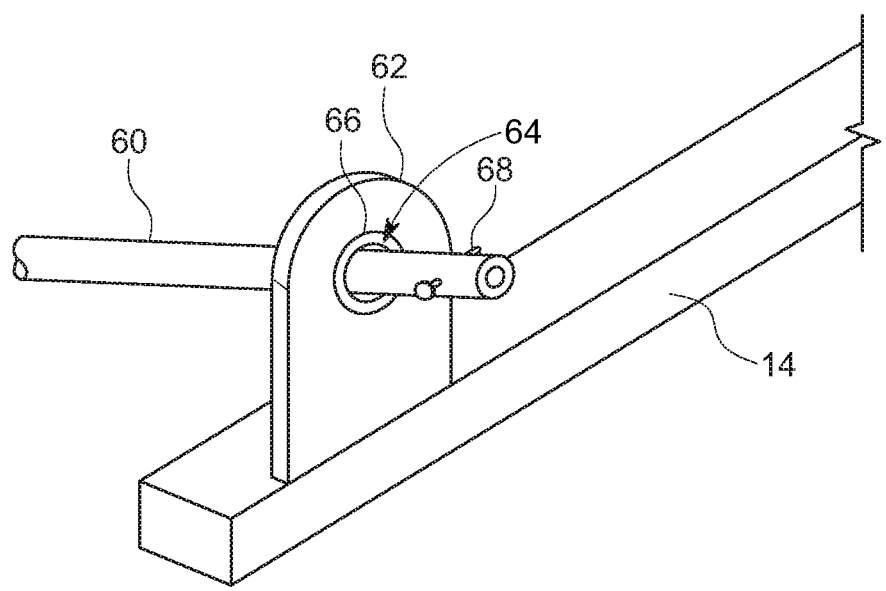
FIG. 5 is a detailed view of the top end of a support rod of the apparatus of FIG. 1.

Turning back to FIGS. 3 and 4, the apparatus includes a push bar 80 extending transversely along the apparatus. In an initial position the push bar 80 is proximate to and parallel with the top and bottom members 14 and 16. The push bar 80 may be secured to a chain 82 supported on a chain track 84 extending along one or more tines 40. As illustrated in FIGS. 2-4, the track 84 is located on two of the tines 40 although it will be appreciated that the track 84 may also be located along more or fewer tines. The track 84 supports a drive sprocket 86 near the proximate end 42 of the tine and an idler sprocket 88 proximate to the distal end 44 of the tine having the chain 82 extending therebetween. The track also provides an interior therein for the chain 82 to return wherein the chain is supported above the track along the top path. The push bar 80 is secured to the chain such that rotation of the drive sprocket will rotate the chain 82 and thereby move the push bar 80 from the initial position illustrated in FIG. 3 to the final position illustrated in FIG. 4. At the final position in FIG. 4, any bales of hay will be pushed from between the tines facilitating unloading of the apparatus. Once the bales are removed, the chain may be rotated in the opposite direction to return the push bar to the initial position shown in FIG. 3.

The drive sprocket 86 may be driven by any rotary motor 90 as illustrated in FIG. 2. In particular, the motor 90 may comprise an electric, pneumatic or hydraulic motor. In particular where the motor is hydraulic, the hydraulic system of the vehicle 6 may be utilized and connected to the apparatus 10 for such purpose accordingly to known means. The apparatus may also include flow and pressure control valves as are commonly known in the hydraulic system so as to limit the speed of the push bar 80 and stop movement of the chain 82 when it reaches each sprocket so as to prevent damage thereto.

Figure 7:
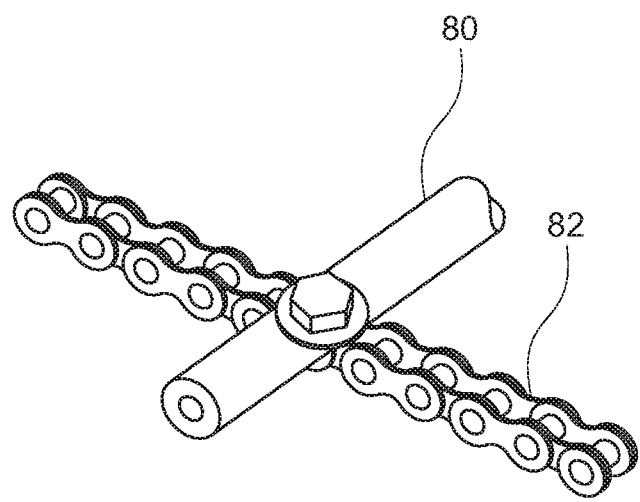
FIG. 7 is a detailed perspective view of the push bar and chain of the apparatus of FIG. 1.

The track 84 may be supported on the tine 40 by first and second brackets 100 and 102, respectively. The first bracket 100 may comprise at least one plate or bracket pivotally supported by the same shaft 85 (or co-axial therewith) driving the sprocket such that any rotation of the track will maintain a contestant distance between the drive sprocket 86 and the idler sprocket 88. The second bracket 102 provides a movable or slidable support on the tine 40 adjacent to the distal end 44. As illustrated in FIG. 6, the second bracket 102 may be formed as a plate or the like secured to the tine 40 by welding, bolting or any other connection wherein the second bracket 102 supports one or more roller or bearing 104 extending therefrom. The track 84 includes at least a bottom opening 83 adapted to surround and captures the rollers 104 so as to permit the track to freely move along the tine 40 relative to the second bracket 102. The track 84 may further include a top passage 87 therealong to receive the bottom portion of the chain returning to from the idler sprocket 88 to the drive sprocket 86. As illustrated in FIG. 7, the push bar 80 may be secured to the chain 82 by bolts or other fasteners passed through the push bar and links of the chain 82.

In operation, a user may operate the vehicle 6 so as to pass a bale 8 between a pair of tines 40 to pick that bale of hay up. Subsequent placements will similarly stack or arrange the bales in as many rows and depts. As the apparatus 10 is designed for. While the vehicle 6 moves over uneven ground the support rods 60 are permitted to move backwards through the bores 64 to allow individual tines 40 to lift as needed. When the apparatus if full, the vehicle 6 may lift the entire apparatus whereby the pins 68 in the support rods 60 prevent downward rotation of the tines thereby lifting all the bales on the flanges 50. When positioned at the desired location the motor 90 turns the drive sprocket to move the push bar towards the distal end of the tines thereby either pushing the bales out from between the tines or permitting the vehicle to back up while leaving the bales behind.

While specific embodiments have been described and illustrated, such embodiments should be considered illustrative only and not as limiting the disclosure as construed in accordance with the accompanying claims.

What is claimed is:

1. An apparatus for stacking hay bales comprising:
    a base frame securable to a motorized vehicle;
    a plurality of tines pivotally connected to the base frame at a tine pivot, each of the plurality of tines extending to free distal ends, the tines defining locations therebetween spaced to correspond to a bale of hay, wherein each of the plurality of tines are freely pivotally supported by the base frame so as to permit independent rotation of each of the plurality of tines;
    a track pivotally supported by the base frame at a track pivot adjacent to and above the plurality of tines, wherein the track pivot is independent of the tine pivot for its corresponding tine such that the track is rotatable independently of the tine with respect to the base frame; and
    a push bar supported on the track extending parallel to the base frame and movable between a retracted position proximate to the base frame to an extended position along the track to push the hay bales from therebetween.

2. The apparatus of claim 1 further comprising a chain drive supported by said track for moving the push bar between the retracted and extended positions.

3. The apparatus of claim 2 wherein the track extends along at least one of the plurality of tines.

4. The apparatus of claim 2 wherein the chain drive includes a drive sprocket secured to the base frame and a distal sprocket supported by the track with a chain driven therebetween.

5. The apparatus of claim 4 wherein the push bar is secured to the chain.

6. The apparatus of claim 4 wherein the drive sprocket is rotated by a motor.

7. The apparatus of claim 6 wherein the motor is selected from the group consisting of an electric motor, a pneumatic motor and a hydraulic motor.

8. The apparatus of claim 1 wherein each of the plurality of tines are supported by a support member extending from the tine to the base frame at a position above the pivot connection for that tine.

9. The apparatus of claim 8 wherein the support members are received in bores in the base frame.

10. The apparatus of claim 9 wherein the support members are slidably received within the bores.

11. The apparatus of claim 10 wherein each of the bores includes a spherical bearing therein.

12. The apparatus of claim 10 wherein the support members include a stop adapted to limit the downward rotation of the plurality of tines below horizontal and permit rotation above horizontal.

13. The apparatus of claim 1 wherein the plurality of tines include a base flange extending away therefrom so as to form a support surface for supporting a hay bale thereon.

14. The apparatus of claim 1 wherein the push bar is located above the plurality of tines.

15. A method for stacking hay bales comprising:
    passing at least two of a plurality of independently rotatably supported tines to each side of a hay bale wherein the tines are pivotally supported by a base frame at a tine pivot;
    lifting the hay bale by a platform extending from a base of the plurality of tines; and pushing the hay bales off the tines with a push bar movable from a retracted position adjacent to a base frame supporting the plurality of tines to a positon proximate to the distal end of the plurality of tines, and wherein the push bar is supported by a track pivotally connected to the base frame at a track pivot so as to position the track adjacent to and above the plurality of tines such that the track is rotatable independently of the tine with respect to the base frame.

* * * * *